United States Patent [19]

Oginaezawa

[11] Patent Number: 5,630,242

[45] Date of Patent: May 20, 1997

[54] SEAT BELT CUTTER

[75] Inventor: Takao Oginaezawa, Niigata, Japan

[73] Assignee: Yugenkaisha MD, Niigata-ken, Japan

[21] Appl. No.: 508,396

[22] Filed: Jul. 31, 1995

[30] Foreign Application Priority Data

Aug. 1, 1994 [JP] Japan ..................... 6-197149

[51] Int. Cl.$^6$ ............................. B25F 1/00; B60R 22/32
[52] U.S. Cl. ................... 7/144; 30/294; 30/298.1
[58] Field of Search ........................... 30/296.1, 294, 30/298.4, 123, 142; 7/144; 81/21

[56] References Cited

U.S. PATENT DOCUMENTS 5,085,449  2/1992  Hudson ..................... 30/296.1

FOREIGN PATENT DOCUMENTS 531679    3/1993   European Pat. Off. ........... 7/144
1922162  11/1969   Germany .
54-141575 10/1979   Japan .
64-9077   1/1989   Japan .
64-2657   1/1989   Japan .
5-58519   1/1992   Japan .
4-28506   5/1992   Japan .

Primary Examiner—Douglas D. Watts
Attorney, Agent, or Firm—Birch, Stewart, Kolasch & Birch, LLP

[57] ABSTRACT

A seat belt cutter comprising an upper surface member, a lower surface member which is longer than the upper surface member, a gripping handle member constituted of the upper surface member and the lower surface member, a hammer member having a sharply pointed tip portion and secured to the upper surface member side of a head portion of the gripping handle member, a blade member having a serrated edge portion formed at a lengthwise central portion of the lower surface member and extending from an inner side of the open distal end portion to an internal portion thereof, and a groove portion formed in a lengthwise central portion of the upper surface member in such a manner as to be opposite the blade, the groove portion having a depth deep enough to receive the edge portion of the blade therein.

16 Claims, 6 Drawing Sheets

SEAT BELT CUTTER

BACKGROUND OF THE INVENTION

1. Field of the Invention

This invention relates generally to a seat belt cutter.

2. Brief Description of the Related Art

Recently, vehicle collision accidents occur frequently. In such a case, the seat belts for the driver's and other passengers including an assistant driver sitting next to the driver are abruptly locked at the moment a vehicle collision occurs. As a result, the driver, etc. are suddenly put into a situation where they cannot move even if they want to quickly escape from the vehicle.

To cope with the above situation, some vehicles have a cutter, scissors, etc. kept in the neighborhood of the driver's seat so that the seat belts can be cut with the cutter, etc. when a vehicle collision occurs. However, since these cutters, etc. have sharp edges exposed from the gripping handle portion, there is a risk that the user will cut their finger tip by mistake when in use. Moreover, since there are no scissors which are designed specially for the above purpose, the seat belt cannot be cut rapidly and completely by a single operation. Therefore, they are not good enough in view of practical use.

SUMMARY OF THE INVENTION

It is, therefore, a general object of the present invention to provide a tool or device which is designed specially for enhancing a quick escape from a vehicle when a vehicle collision occurs.

A specific object of the present invention is to provide a seat belt cutter, in which the above-mentioned inconveniences inherent in the conventional devices can be obviated and the seat belt can be cut or broken, when such a necessity arises, rapidly and without substantially any handling risk.

In order to achieve the above objects, according to the present invention, there is essentially provided a seat belt cutter comprising an upper surface member; a lower surface member which is longer at an opening distal end portion thereof than the upper surface member; a gripping handle member constituted of the upper surface member and the lower surface member; a hammer member having a sharply pointed tip portion and secured to the upper surface member side of a head portion of the gripping handle member; a gap being defined at a lengthwise central portion of the lower surface member and extending from a side central portion of the upper and lower surface members; a blade member having a serrated edge portion formed at a lengthwise central portion of the lower surface member and extending from an inner side of the open distal end portion to an internal portion thereof; and a groove portion formed in a lengthwise central portion of the upper surface member in such a manner as to be opposite the blade, the groove portion having a depth deep enough to receive the edge portion of the blade therein. The seat belt cutter may further comprise a transparent cap member fitted to the sharply pointed tip portion of the hammer member. Also, the seat belt may further comprise a magnet member disposed on a reverse surface portion of the lower surface member of the gripping handle member.

With the above-mentioned construction, presume that a person, for example, a driver, had a vehicle collision accident while driving a vehicle and the seat belt was locked. Since the driver is instantaneously put into a condition under which he cannot escape from the seat, he inserts the opening distal end portion of the upper and lower surface members of the gripping handle member of the present seat belt cutter toward an optional part of the belt first. Then, when a part of the belt contacts the edge portion of the blade member at the opening distal end portion of the gripping handle member, the belt is forcibly pushed therein with the belt held in the gripping member. Then, the belt is cut by the serrated edge portion.

When the vehicle door does not open, the door glass and/or front glass are hit hard by the sharply pointed tip portion of the hammer member with the handle member grasped by the hand. Then, since the glass is cracked and destroyed immediately, the driver, etc. can escaped therethrough. When the cap member is fitted to the sharply pointed portion, the glass may be hit by the hammer member with the cap member fitted thereto.

The above and other objects, characteristic features and advantages of the present invention will become more apparent to those skilled in the art by the following description of the preferred embodiments of the invention, as illustrated in the accompanying drawings.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF THE EMBODIMENT

Figure 1:
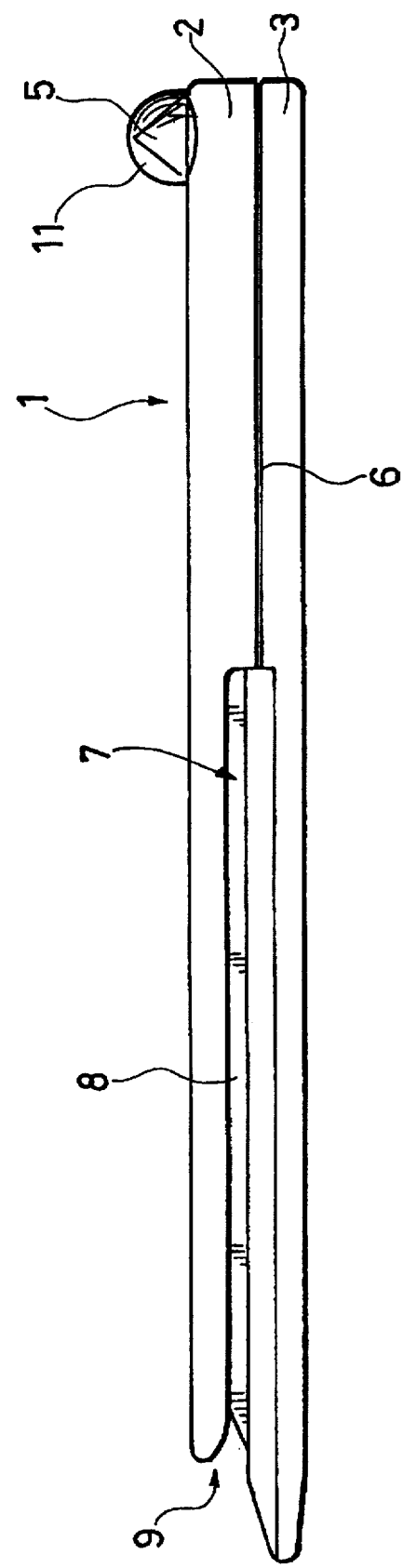
FIG. 1 is a side view showing an overall picture of a seat belt cutter according to one embodiment of the present invention.
Figure 2:
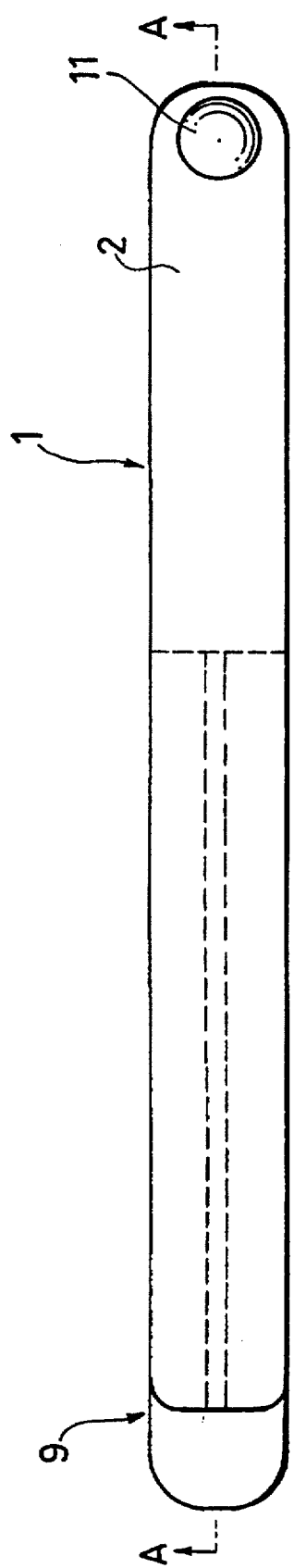
FIG. 2 is a plan view of the seat belt cutter of FIG. 1.
Figure 3:
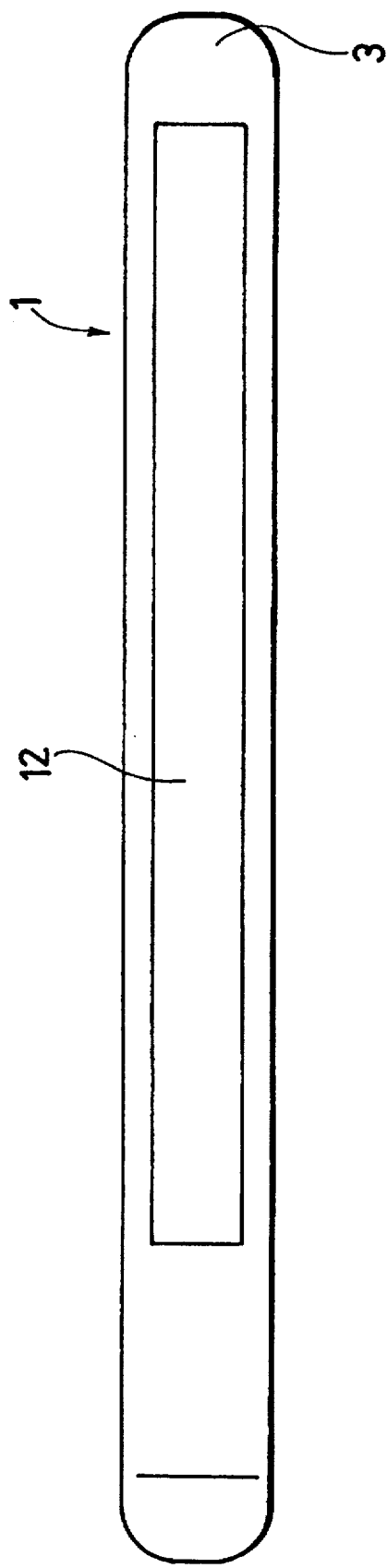
FIG. 3 is a bottom view of the seat belt cutter of FIG. 1.
Figure 4:
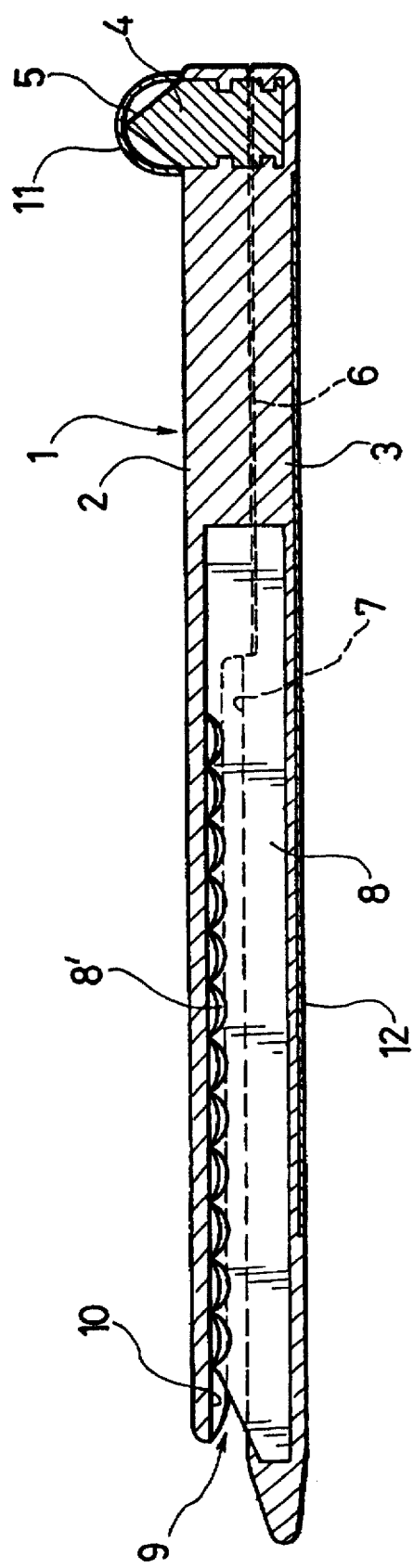
FIG. 4 is a vertical sectional view taken on line A—A of FIG. 2.
Figure 5:
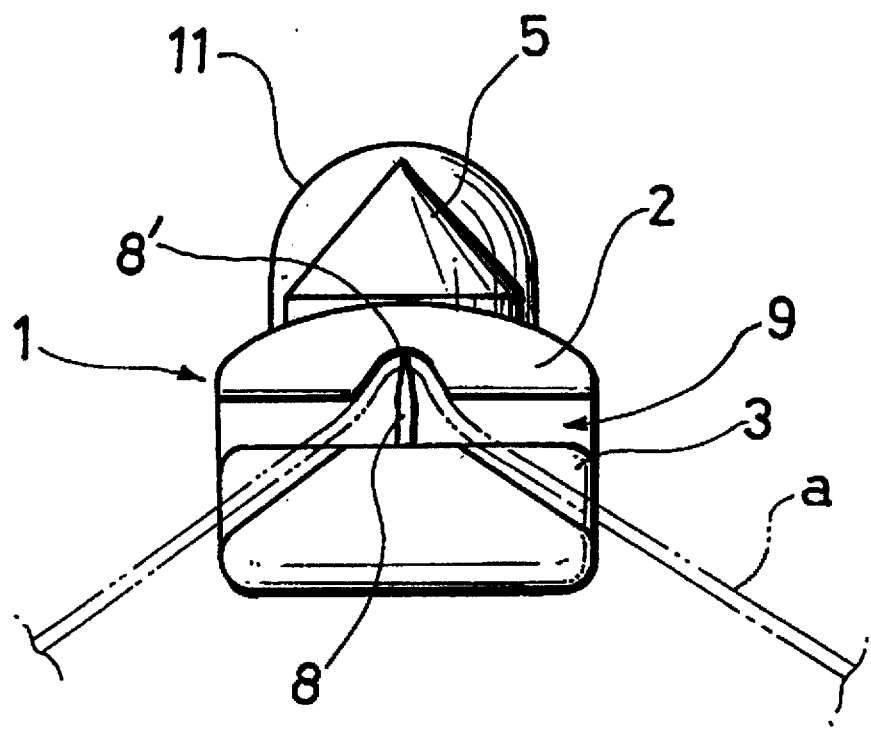
FIG. 5 is an enlarged front view of the seat belt cutter when in use.

Reference numeral 1 denotes a gripping handle member serving as both a sheath portion and a handle portion of a blade member 8 as later described. This gripping handle member 1 comprises an upper surface member 2 and a lower surface member 3 which is longer at its open distal end portion than the upper surface member 2.

Figure 6:
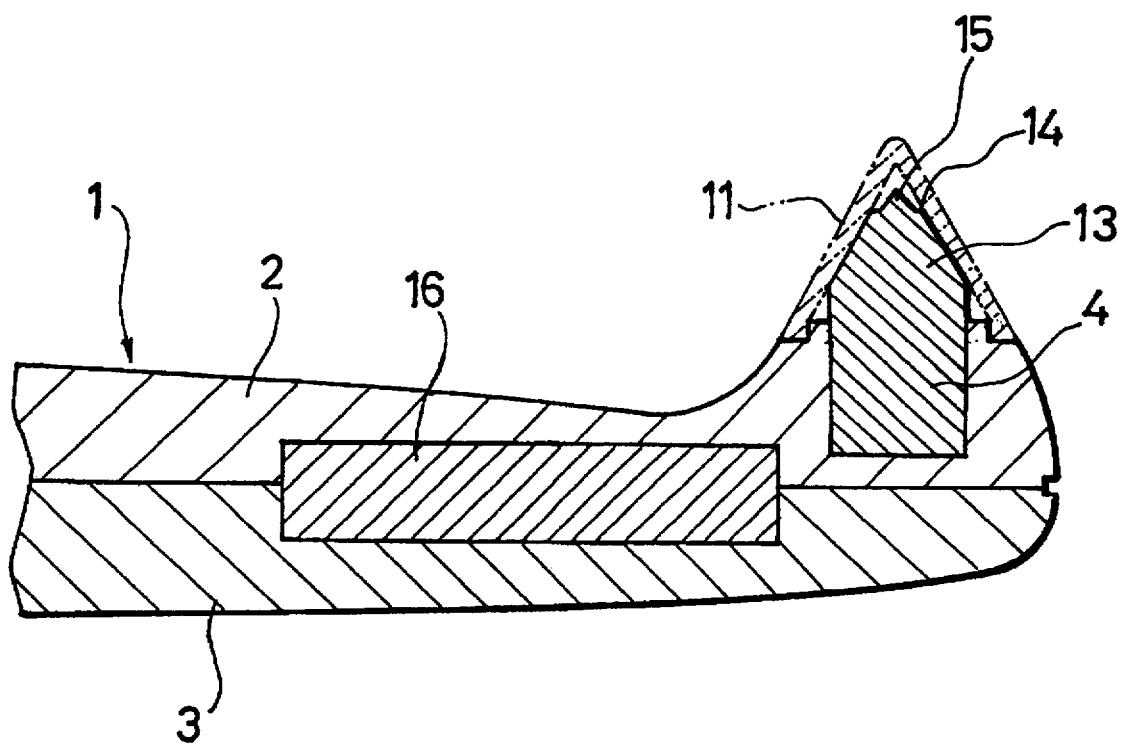
FIG. 6 is a sectional side view of an important portion of a seat belt cutter according to another embodiment of the present invention.

Reference numeral 4 denotes a hammer member secured to an upper surface side of a head portion of the gripping handle member 1 consisting of the upper surface member 2 and a lower surface member 3. A tip portion 5 of this hammer member 4 is defined as a sharply pointed end. In another embodiment as seen in FIG. 6, a peripheral stepped portion 14 is formed on an upper surface of a conical base portion 13 so that a sharpened end portion 15 of the hammer member is different in angle of inclination from the base portion 13.

The upper surface member 2 and the lower surface member 3 of the gripping handle member 1 defines a Joint portion 6 from the side central portion to the base portion and a gap portion 7 from the side central portion to the opening distal end portion. Owing to this arrangement, the upper surface member 2 is resiliently biased from the neighborhood of a contacting point between the joint portion 6 and the gap portion 7.

Reference numeral 8 denotes a blade member having an inclined distal end portion. This blade member 8 is disposed at a lengthwise central portion of the lower surface member 3 and extends from an inner side of the opening distal end portion 9 toward the inner part thereof. A serrated edge portion 8' is formed on the upper surface portion of the blade.

Reference numeral 11 denotes a transparent cap member adapted to cover a protruded portion of the hammer member 4 having the afore-mentioned sharply pointed portion 5. This cap member 5 may take any desired configuration. Since this cap member is designed solely for the purpose of covering the hammer member 4 in order to prevent any risk, the thickness is comparatively small in order to facilitate breakage. When the hammer member 4 is used, there is no trouble even if it is used with the cap member 5 fitted to it.

Reference numeral 12 denotes a magnet placed on a rear surface portion of the lower surface member 3. This magnet, when employed, is magnetically attached to a suitable place around the driver's seat but employment of the magnet is not mandatory.

In another embodiment, a weight 16 is confined in that portion of the gripping handle member 1 adjacent to the hammer member 4 which corresponds to the head portion of the gripping handle member 1, so that an impact of the hammer member 4 to the window glass is accelerated when the hammer member 4 is hit against the window glass by the driver holding the gripping handle member with the hand.

Since the present invention is constructed in the manner as mentioned above, when the seat belt cutter on a suitable place around the driver's seat is used on emergency, the driver is prevented from being accidentally cutting his finger tip with the edge of the blade or the sharply pointed end. Thus, safe and easy use of the seat belt cutter is always ensured.

Furthermore, the seat belt cutter can always be cut rapidly and reliably, and the door glass can be positively broken. Thus, effective use of the seat belt cutter is enhanced.

While some preferred embodiments of a seat belt cutter according to the present invention have thus far been described with reference to the drawings, it should be borne in mind that such embodiments are merely illustrative of the gist of the present invention and are accordingly subject to modification and change.

What is claimed is:

1. A seat belt cutter comprising:
   an upper surface member;
   a lower surface member, the upper surface member being joined to and overlying the lower surface member;
   a gap being formed between the upper and lower surface members, the gap extending lengthwise in the seat belt cutter from a first end of the seat belt cutter, the lower surface member being longer than the upper surface member with an end of the lower surface member extending beyond the upper surface member at the first end of the seat belt cutter;
   a gripping handle member formed by said upper surface member and said lower surface member, the gripping handle member having a head portion on a second end of the seat belt cutter, the first and second ends of the seat belt cutter being opposed ends;
   a hammer member having a sharply pointed tip potion and being secured to the upper surface member at the head portion of the gripping handle member;
   a blade member positioned within the gap, the blade member being attached to the lower surface member and having a serrated edge portion, the blade member extending lengthwise in the seat belt cutter and the serrated edge portion having a top and sides;
   a groove defined in the upper surface member, the groove overlying the serrated edge portion of the blade member and the portion of the upper surface member forming the groove enclosing the top and at least a portion of the sides of the serrated edge portion to thereby cover the serrated edge portion, the portion of the upper surface member defining the groove being spaced from the serrated edge portion of the blade member.

2. The seat belt cutter according to claim 1, further comprising a cap member fitted to the sharply pointed tip portion of the hammer member.

3. The seat belt cutter according to claim 2, wherein the cap member is transparent.

4. The seat belt cutter according to claim 1, further comprising a magnet member on the lower surface member.

5. The seat belt cutter according to claim 4, wherein the magnet member is on a side of the lower surface member opposite to a side to which the upper surface member is joined.

6. The seat belt cutter according to claim 1, wherein the gap is open on the first end and two adjoining sides of the seat belt cutter and wherein the groove is open on the first end of the seat belt cutter.

7. The seat belt cutter according to claim 6, wherein all of the sides of the serrated edge portion of the blade member are enclosed by the portion of the upper surface member forming the groove except at the groove opening on the first end of the seat belt cutter.

8. The seat belt cutter according to claim 7, wherein the serrated edge portion of the blade member is accessible through the gap and through the groove opening on the first end of the seat belt cutter and wherein the gap extends from the first end of the seat belt cutter to a central portion of the seat belt cutter.

9. The seat belt cutter according to claim 11, wherein the blade member extends generally along an entire length of the gap.

10. The seat belt cutter according to claim 1, wherein an entire length of the sides of the serrated edge portion of the blade member is enclosed by the portion of the upper surface member forming the groove.

11. The seat belt cutter according to claim 1, wherein:
   a first plane passes through a center of the blade member, the first plane extending lengthwise of the seat belt cutter such that the first plane is parallel to a longitudinal axis of the seat belt cutter, the first plane passes through the groove; and
   a second plane generally perpendicular to the first plane, the second plane intersecting the top of the serrated edge portion and intersecting the portion of the upper surface member forming the groove,
   the gap extends from the first end of the seat belt cutter to a central portion of the seat belt cutter.

12. The seat belt cutter according to claim 11, wherein the blade member extends generally along an entire length of the gap.

13. The seat belt cutter according to claim 1, wherein the upper surface member and the lower surface member are spaced a constant distance from one another along the length of the gap.

14. The seat belt cutter according to claim 1, further comprising a magnet member embedded in the seat belt cutter between the lower surface member and the upper surface member.

15. The seat belt cutter according to claim 1, wherein the hammer member has a peripheral stepped portion formed on an upper surface of a conical base portion, the sharply pointed tip portion having a different angle of inclination from the base portion.

16. The seat belt cutter according to claim 1, wherein the sharply pointed tip portion of the hammer member generally has a uniform angle of inclination from the upper surface member to an outer end of the tip portion.

* * * * *

UNITED STATES PATENT AND TRADEMARK OFFICE
CERTIFICATE OF CORRECTION

PATENT NO. : 5,630,242
DATED : May 20, 1997
INVENTOR(S) : Takao Oginezawa

It is certified that error appears in the above-indentified patent and that said Letters Patent is hereby corrected as shown below:

On the title page, Item [19],
Please correct the Inventor's Name from "OGINAEZAWA" to --OGINEZAWA--.

Item 75, change "Oginaezawa" to --Oginezawa--.

Item 73, change "MD" to --MID--.

Signed and Sealed this

Seventh Day of October, 1997

Attest:

BRUCE LEHMAN

Attesting Officer    Commissioner of Patents and Trademarks